(12) United States Patent
Colon et al.

(10) Patent No.: US 12,505,300 B1
(45) Date of Patent: Dec. 23, 2025

(54) FRAUD DETECTION IN TEXT

(71) Applicant: Amazon Technologies, Inc., Seattle, WA (US)

(72) Inventors: Brendan Cruz Colon, Seattle, WA (US); Matthew Michael Sommer, Issaquah, WA (US); Adam Edward Powers, Dublin, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 273 days.

(21) Appl. No.: 17/388,626

(22) Filed: Jul. 29, 2021

(51) Int. Cl.
*G06F 40/35* (2020.01)
*G06F 40/284* (2020.01)

(52) U.S. Cl.
CPC ............ *G06F 40/35* (2020.01); *G06F 40/284* (2020.01)

(58) Field of Classification Search
CPC ............................... G06F 40/35; G06F 40/284
See application file for complete search history.

(56) References Cited

U.S. PATENT DOCUMENTS

| | | | | |
|---|---|---|---|---|
| 7,822,598 B2* | 10/2010 | Carus | ...................... | G06F 40/30 704/9 |
| 9,516,089 B1* | 12/2016 | Ansel | ...................... | H04L 67/02 |
| 10,073,887 B2* | 9/2018 | Chehreghani | ........... | G06F 16/22 |
| 10,659,588 B1* | 5/2020 | Guan | ...................... | G10L 17/04 |
| 11,604,926 B2* | 3/2023 | Venkateshwaran | ... | G06F 40/216 |
| 2020/0067861 A1* | 2/2020 | Leddy | ................ | G06F 21/6245 |
| 2020/0243077 A1* | 7/2020 | Rao | ......................... | G10L 15/30 |
| 2020/0379868 A1* | 12/2020 | Dherange | .............. | G06N 20/20 |
| 2021/0021555 A1* | 1/2021 | Yamamoto | ............ | G06N 20/00 |
| 2021/0241279 A1* | 8/2021 | Patten, Jr. | ................ | G06N 3/04 |

OTHER PUBLICATIONS

Suneera et. al. , "Performance Analysis of Machine Learning and Deep Learning Models for Text Classification," 2020 IEEE 17th India Council International Conference (INDICON), New Delhi, India, 2020, pp. 1-6 (Year: 2020).*

(Continued)

*Primary Examiner* — Bhavesh M Mehta
*Assistant Examiner* — Nandini Subramani
(74) *Attorney, Agent, or Firm* — K&L Gates LLP

(57) ABSTRACT

Devices and techniques are generally described for detection of fraud in text. In various examples, ground truth text data comprising a plurality of first transcripts related to fraudulent activity may be received. In some examples, a respective first data representation of each transcript of the plurality of first transcripts may be generated. Unlabeled text data including a plurality of second transcripts may be received. Second data representations of each transcript of the plurality of second transcripts may be generated. A plurality of clusters may be determined. A number of nearest neighbors that are associated with the plurality of first transcripts related to fraudulent activity may be determined for a first instance of the second data representations. A determination may be made that the first instance of the second data representations corresponds to a transcript related to fraudulent activity.

20 Claims, 7 Drawing Sheets

(56) References Cited

OTHER PUBLICATIONS

Zareapoor M, et. al. Analysis on credit card fraud detection techniques: based on certain design criteria. International journal of computer applications. Jan. 1, 2012;52(3). (Year: 2012).*

Islam, Mohammed J., et al. "Investigating the performance of naive-bayes classifiers and k-nearest neighbor classifiers." 2007 international conference on convergence information technology (ICCIT 2007). IEEE, 2007. (Year: 2007).*

Zareapoor, M et al. . "Application of credit card fraud detection: Based on bagging ensemble classifier." Procedia computer science 48.2015 (2015) (Year: 2015).*

* cited by examiner

FRAUD DETECTION IN TEXT

BACKGROUND

Online fraud attempts continue to grow year-over-year, putting pressure on online entities and network administrators to innovate in order to protect customers, revenue, and prevent service disruption. The field of online fraud detection and cyberattack prevention can be categorized as an adversarial environment, where those with intentions to commit fraud and/or malicious cyber attacks are pitted against those endeavoring to prevent and deter such activity. This "arms race," as it is often referred to, involves continuous adaptation, as tactics of the opponents evolve over time.

DETAILED DESCRIPTION

Figure 1:
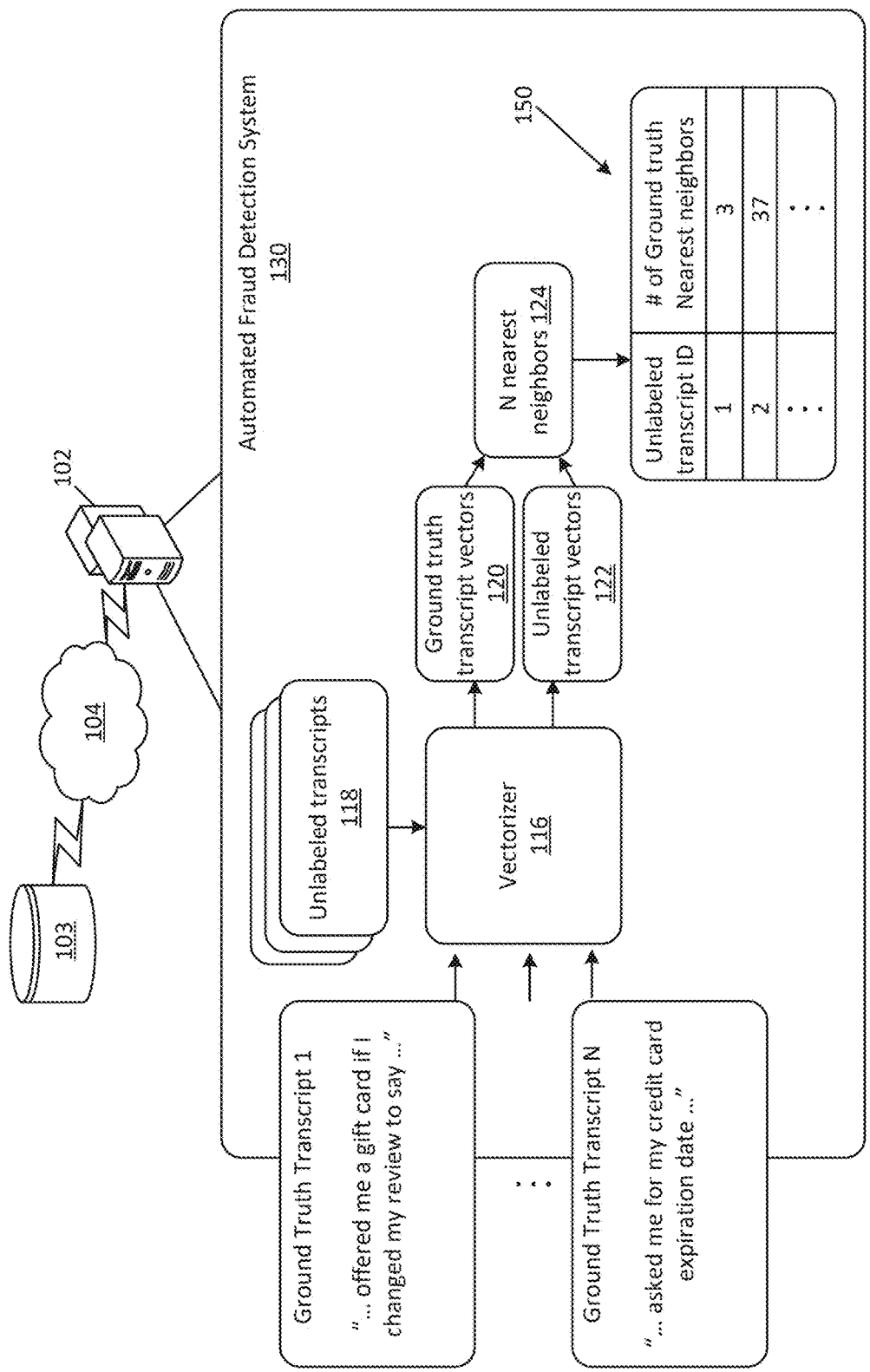
FIG. 1 is a block diagram illustrating an example automated fraud detection system for text, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In customer service fraud scams, bad actors impersonate legitimate customer support agents, and, under the guise of providing genuine services, obtain fraudulent payments from customers. Bad actors use a variety of lead generation techniques-including emails, phone calls, ringless voicemails, online ads, and websites-to prompt potential victims to call a phone number. These messages often contain false representations about the security of the customer's account, such as stating unauthorized charges were made on the account. Once on the call, bad actors impersonate genuine customer support, misrepresent an issue with victims' accounts (e.g., stating that "hackers" accessed the account), and obtain financial payments to remedy the non-existent issue. The schemes vary in maliciousness, from claims that an account requires an "activation fee," to bad actors displaying illegal and/or embarrassing material to extort a financial payment from the victim. Customer service fraud closely resembles fraudulent technical support schemes (e.g., the classic technical support fraud to solve non-existent computer issues).

Following such attacks and/or attempted attacks, customers often reach out through legitimate channels to authentic customer support agents to describe and/or attempt to remedy what transpired during the fraudulent call (e.g., an account take over and/or fraudulent payment). In some examples, text transcripts of such legitimate calls are available. The text transcripts can provide insights into the techniques used by the bad actors to commit fraud. As these transcripts can only be obtained when the victim (or attempted victim) reaches out through legitimate customer service channels, it is reasonable to assume that the data only reflects a percentage of actually customer service fraud scheme activity-since many such fraud attempts go unreported. In various other examples, text transcripts may describe other illegal and/or unpermitted acts, such as review manipulation wherein sellers attempt to manipulate the reviews left by buyers (e.g., through promises of gift cards and/or other perks) in violation of policies. The text transcripts may be generated from various sources. For example, the input text transcripts may be directly provided via user emails describing past experiences with a person purporting to be a legitimate customer service agent. In other examples, the input text transcripts may be automatically generated (e.g., using automatic speech recognition) from audio recordings (and/or mixed audio/video recordings) captured during a phone call and/or video call with a customer service agent when the user is describing a past interaction with a person purporting to be a legitimate customer service agent. In other examples, a hearing impaired individual may describe the past interaction using sign language. The sign language may be translated to text using automated systems and/or manually, by a customer service agent that is adept at sign language. The various techniques described herein may be used regardless of the original method of communication, and the transcripts may be generated from any type of communication.

In various examples described herein techniques may be used to detect fraud that is being described in text. For example, a customer that has an account with an e-commerce service may have experience fraud. For example, an attacker may have posed as a representative of the e-commerce service and may have directly contacted the customer to attempt to obtain sensitive information, etc. The customer may thereafter contact a legitimate representative of the e-commerce service and may describe what occurred previously when the attack or attempted attack occurred.

Transcripts of customer service calls may be generated and/or otherwise obtained (e.g., using automatic speech recognition). In various examples described herein, a set of transcripts that have been analyzed by human annotators (and/or which have otherwise been determined to be related to and/or describing fraudulent activity) may be obtained. The terminology "fraudulent activity," as used herein, may be broadly construed to incorporate descriptions of various types of malevolent activity. Some examples may include customers describing past instances of attempts by third parties to obtain sensitive and/or financial information, attempts by third parties to impersonate legitimate customer support when, in fact, such third parties are unaffiliated with the legitimate customer support entity. Some further examples may include attempts at review manipulation, descriptions of rude behavior, etc. Whatever the type of "fraudulent activity" that is described, the set of transcripts that have been analyzed by human annotators (and/or which have otherwise been determined to be related to and/or describing fraudulent activity) may be referred to as "ground truth" transcripts. Techniques may be used to transform the ground truth transcripts into vector representations that represent words and/or phrases present in the corpus of ground truth transcripts. As described in further detail below, various processing techniques may be used to "vectorize" the ground truth transcripts to represent the words and/or phrases that are most significant to the fraud detection task with ground truth transcript vectors. For example, term frequency-inverse document frequency (TF-iDF) may be used to determine the relative importance of various words and/or phrases to the corpus of ground truth transcripts.

A number of unlabeled transcripts may also be obtained. These unlabeled transcripts may be, for example, new text transcripts of phone calls between customer service agents and customers that have not been evaluated and/or labeled as to whether they pertain to fraudulent activity. These unlabeled transcripts may be vectorized using the same techniques as used to generate the ground truth transcript vectors to generate unlabeled transcript vectors.

Thereafter, the ground truth transcript vectors may be injected into the data set comprising the unlabeled transcript vectors. A similarity algorithm (such as a nearest neighbor algorithm) may be used to determine clusters of the ground truth transcript vectors and the unlabeled transcript vectors in a shared embedding space. The similarity between the ground truth transcript vectors and the unlabeled transcript vectors may be obtained as a result of the clustering performed by the nearest neighbor algorithm. For example, cosine similarity and/or Euclidean distance may be used to determine the similarity between various vectors (depending on the particular vectorizer used). Any nearest neighbor algorithm may be used; although, in some cases, using an approximate nearest neighbor algorithm (such as approximate nearest neighbors oh yeah (ANNOY)) may be faster and/or more scalable relative to more accurate and/or complete nearest neighbor approaches. ANNOY may be used to drastically reduce compute time. ANNOY subdivides n-dimensional space by inserting random hyperplanes through the data to subdivide the search space.

In various examples, the N nearest neighbors may be determined for each of the ground truth transcript vectors. Thereafter, for each unlabeled transcript vector, the number of times that the pertinent unlabeled transcript vector appeared as one of the N nearest neighbors of a ground truth vector may be determined. Unlabeled transcript vectors that are nearest neighbors to a relatively high number of ground truth transcripts are likely to pertain to and/or describe fraudulent activity. In some examples, topic modeling techniques such as Latent Direchlet Allocation (LDA) may be used to organize the potentially-fraulent transcripts (e.g., those with a high number of ground truth nearest neighbors and/or those with high similarity scores to ground truth transcripts) into topics and/or associated keywords/keyphrases. Resulting topics may be scrutinized for unique words and/or links that may be actionable for building a case for legal takedown and/or detecting/preventing future fraudulent activity.

In various examples, the automated fraud detection system described herein may be able to detect potential fraud in transcripts at a scale that would not be possible for human investigators to detect. Additionally, the automated fraud detection system may uncover patterns in descriptions of fraudulent activity that seem innocuous and which would not be detectable by a human investigator. The various techniques describe herein generate a fraud detection system that can automatically detect fraudulent activity even when a human investigator is unable to determine that the description is related to such activity and provides various technological improvements (described in detail below) relative to previous automated fraud detection systems.

FIG. 1 is a block diagram illustrating an example automated fraud detection system 130 for text, according to various embodiments of the present disclosure. In various examples, one or more computing devices 102 may implement the automated fraud detection system 130. In examples where more than one computing device 102 implements the automated fraud detection system 130, the different computing devices 102 may communicate with one another over a network 104. For example, a remote computing device (and/or remote system of computing devices) may communicate with automated fraud detection system 130 via an application programming interface (API) as a cloud-based service. For example, text data comprising transcripts that may or may not comprise descriptions of fraudulent activity may be sent to the automated fraud detection system 130 for evaluation, as described herein.

In various examples, each of the one or more computing devices 102 used to implement automated fraud detection system 130 may comprise one or more processors. The one or more computing devices 102 used to implement automated fraud detection system 130 may be configured in communication with at least one non-transitory computer readable memory 103 ("memory 103"). In at least some examples, the one or more computing devices 102 used to implement automated fraud detection system 130 may communicate with memory 103 over network 104. The memory 103 may store computer-readable instructions that, when executed by at least one processor of the one or more computing devices 102 implementing automated fraud detection system 130, may be effective to program the one or more processors to perform the various fraud detection techniques and/or execute the various algorithms described herein. It should be noted, while many of the examples described herein refer to detecting the fraudulent activity, in many cases, the techniques described herein may be used to detect descriptions and/or text that describes fraudulent activity, rather than the fraudulent activity itself. This may be because, the transcripts received as input text to the automated fraud detection system 130 may be users calling in to describe a past experience.

In various examples, network 104 is a wide area network, such as the Internet, while in other embodiments, the network 104 is a local area network (LAN) over which requests may be received. In some further embodiments, network 104 is a combination of the Internet and a LAN.

In various examples, automated fraud detection system 130 may receive text data comprising a plurality of text transcripts determined to be describing fraudulent activity. Although "transcripts" are generally referred to herein, the term "transcripts" may be broadly defined to include any type of text data, whether originally spoken, typed, and/or automatically generated. The plurality of text transcripts may be referred to as ground truth text transcripts describing fraudulent activity as these transcripts may have been labeled (e.g., by a human annotator and/or another machine learning model) as describing fraud.

In the example depicted in FIG. 1, two snippets of ground truth text transcripts are shown (e.g., Ground truth transcripts 1 and N). Ground truth transcript 1 includes text stating " . . . offered me a gift card if I changed my review to say . . . " This may be an example of text describing a previous review manipulation attempt whereby a seller has contacted a buyer in an attempt to have the buyer leave a positive review for the seller. Ground truth transcript N includes text stating " . . . asked me for my credit card expiration date . . . " This may be an example of financial fraud in which an attacker is attempting to obtain sensitive financial information from an individual. Each of the ground truth transcripts may be accepted examples of text that describes and/or otherwise pertains to fraudulent activity. The ground truth transcripts may be labeled with data indicating that these transcripts are accepted examples of descriptions of fraudulent activity.

The ground truth transcripts 1 . . . . N may be sent to a vectorizer 116. The vectorizer 116 may represent each of the ground truth transcripts as a multi-dimensional vector comprising numerical values. In various examples, the elements of the multi-dimensional vectors may represent n-grams (e.g., tokens representing words) present in the corpus of ground truth transcripts received by the automated fraud detection system 130. As described in further detail below in reference to FIG. 2, the n-grams may be selected based upon the number of ground truth transcripts in which the n-grams occur. For example, the bi-gram [change review] may be present in a significant number of ground truth review manipulation transcripts. Accordingly, the automated fraud detection system 130 may determine (using logic described in further detail below) that the bi-gram [change review] provides information about the ground truth transcripts and that the bi-gram should be represented as an element in the vectors output by vectorizer 116. The n-grams that are significantly represented in the ground truth text transcripts may be selected (e.g., n-grams that are present in greater than (or equal to) a minimum number of the N ground truth transcripts and which are present in less than (or equal to) a maximum number of the N ground truth transcripts). Accordingly, each of the elements of the vectors output by vectorizer 116 may be associated with one of the selected n-grams. The values for each of the elements may be represented using a term frequency inverse document frequency (TF-iDF) score for each of the associated bi-grams. TF-iDF scores measure the originality of an n-gram (e.g., a word, phrase, etc.) in the input corpus (e.g., the ground truth text transcripts) by comparing the number of times the word appears in a transcript (e.g., the term frequency) with the number of documents that the word appears in (e.g., the document frequency (DF)). The ground truth transcripts and/or the unlabeled transcripts 118 may be subjected to pre-processing (e.g., removal of stop words, stemming, etc.) prior to calculation of the TF-iDF scores. It should be appreciated that other representations (besides TF-iDF) may be used to instantiate vectorizer 116. In general, the vectorizer 116 may be generated using ground truth transcripts (and not unlabeled transcripts) so that the vectorizer 116 can incorporate the information that best characterizes the fraudulent activity which is described in the ground truth transcripts. Additionally, use of a relatively small number of ground truth transcripts (as opposed to a larger corpus of unlabeled transcripts and/or a combination of ground truth and unlabeled transcripts) enables for lower dimensionality, more efficient computation, and generation of an efficient number of clusters for the clustering of unlabeled transcript data.

In various examples, the vectorizer 116 may output a data representation (e.g., a vector) for each of the N ground truth transcripts. As previously described, each element of the vectors output by vectorizer 116 may correspond to a respective n-gram that is present in the corpus of the N ground truth transcripts. The value of each element is the TF-iDF score for that n-gram for the particular ground truth transcript being evaluated. In various example implementations, the TF-iDF scores may range from 0-1, with higher scores indicating a greater importance of a word in the corpus of the N ground truth text transcripts describing fraudulent activities. According, the vectorizer 116 may output the ground truth transcript vectors 120. Each of the ground truth transcript vectors 120 may be a numerical representation of one of the N ground truth text transcripts related to fraudulent activity.

Additionally, automated fraud detection system 130 may receive a plurality of unlabeled transcripts 118. The unlabeled transcripts 118 may be input into vectorizer 116 and may be transformed into respective data representations (e.g., unlabeled transcript vectors 122). The elements of the unlabeled transcript vectors 122 may represent the same n-grams as the corresponding elements of the ground truth transcript vectors 120. For example, the first element of any vector output by the vectorizer 116 (for a given set of inputs) may correspond to the same n-gram. Similarly, the second element of any vector output by the vectorizer 116 may correspond to the same n-gram. For example, the first element of the representative vectors output by vectorizer 116 may correspond to the mono-gram "fraud," the second element of the representative vectors output by vectorizer 116 may correspond to the bi-gram "call back," and so on. The value for any particular vector element may be the TF-iDF score for that n-gram for the particular text data being vectorized (e.g., whether this text data is a ground truth transcript or an unlabeled transcript).

The ground truth transcript vectors 120 are considered together with the unlabeled transcript vectors 122 in a common dataset. An N nearest neighbors algorithm 124 may be used to cluster the various vectors together to find the N nearest neighbors for a subject vector (e.g., kNN, ANNOY, etc.). Any desired value of N may be used. Thereafter, the similarity of a given unlabeled transcript vector 122 to one or more ground truth transcript vectors 120 may be determined based upon their proximity in the shared embedding space.

In one example, each of the ground truth transcript vectors 120 may be evaluated to determine its N nearest neighbors. Then, as shown in table 150, for each unlabeled transcript ID, the number of times that this unlabeled transcript 118 was among the N nearest neighbors to a ground truth transcript vector 120 may be determined. The greater number of times that a data representation of an unlabeled transcript 118 is among the N-nearest neighbors of a ground truth transcript vector 120, the higher the likelihood that the unlabeled transcript 118 describes a similar type of fraud. In the example shown in FIG. 1, a first unlabeled transcript ID is associated with only 3 ground truth nearest neighbors. This may be a relatively low value. Accordingly, there may be a low likelihood that the first unlabeled transcript is associated with fraud. Conversely, a second unlabeled transcript ID is associated with 37 ground truth nearest neighbors. This may be a relatively high value. Accordingly, there may be a high likelihood that the second unlabeled transcript is associated with fraud.

In another example implementation, each of the unlabeled transcript vectors 122 may be evaluated using N nearest neighbors algorithm 124 to determine the number of nearest neighbors for the given unlabeled transcript vector 122. The number of ground truth nearest neighbors may be determined and used as an approximation of the likelihood that the given unlabeled transcript pertains to and/or describes the relevant type of fraud exemplified by the N ground truth transcripts.

Figure 2:
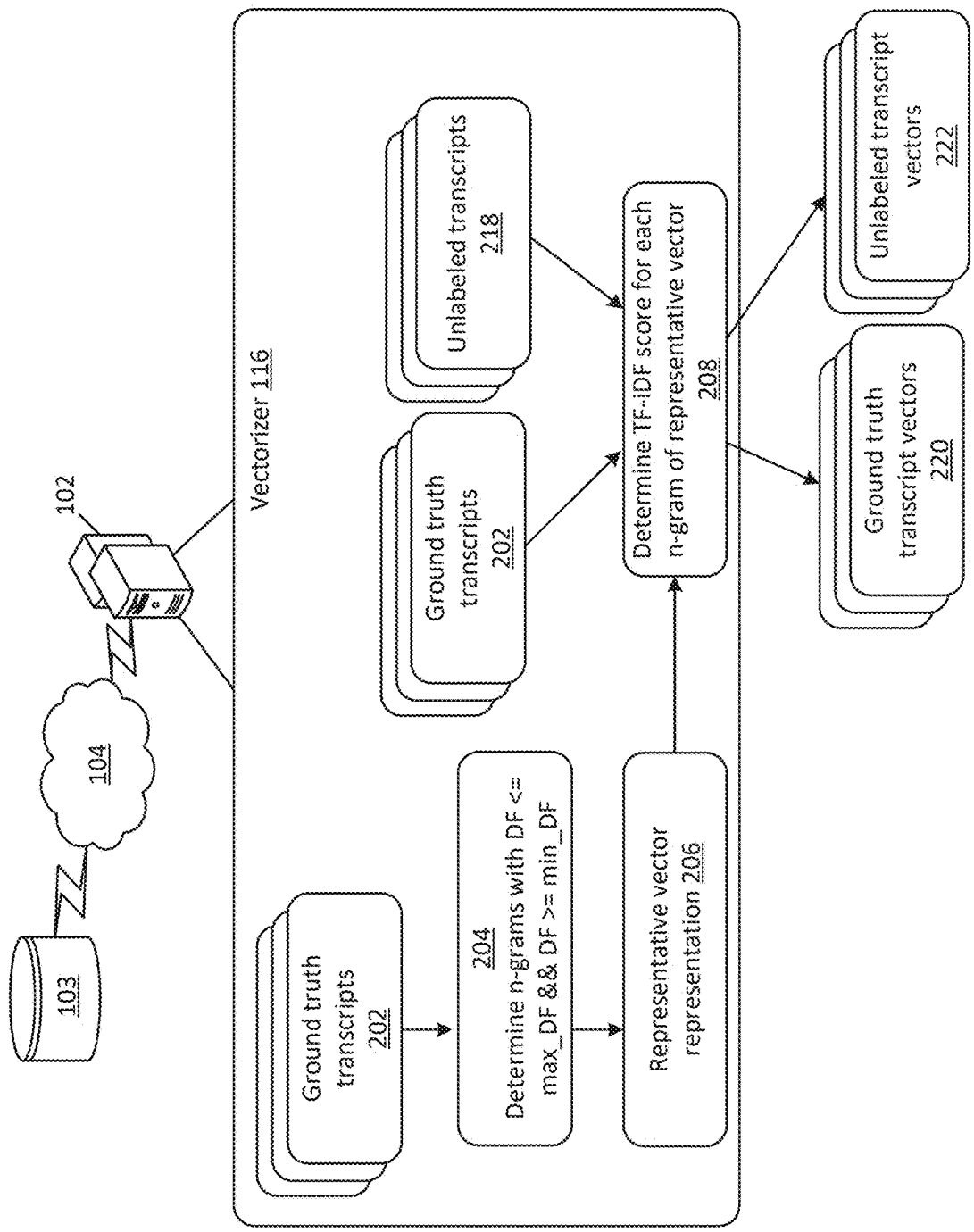
FIG. 2 is a block diagram illustrating an example vectorizer that may be used with the automated fraud detection system of FIG. 1, in accordance with various embodiments of the present disclosure.

FIG. 2 is a block diagram illustrating an example vectorizer 116 that may be used with the automated fraud detection system 130 of FIG. 1, in accordance with various embodiments of the present disclosure. In FIG. 2, the vectorizer 116 may receive the labeled ground truth transcripts 202 (e.g., text data that is labeled as pertaining to and/or describing a particular type of fraudulent activity). In various examples, the ground truth transcripts 202 may be pre-processed to tokenize the words to generate n-gram tokens (e.g., by removal of stop words, lemmatization, etc). In order to determine the appropriate n-grams among the corpus of documents (e.g., the ground truth transcripts 202) to use in a data representation of the corpus, (e.g., the vectorized output of the vectorizer 116), vectorizer 116 may determine the n-grams of the ground truth transcripts 202 that have a DF≤a maximum DF and a DF that is ≥ a minimum DF (action 204). In various examples, the n-grams satisfying these conditions are not so common that they appear in every input transcript (and are thus noise), but are present in a sufficient number of the transcripts to be descriptive of some aspect of (or are otherwise relevant to) the type of the fraudulent activity being discussed.

Accordingly, action 204 may determine a representative vector representation 206 that may be used to represent both the input ground truth transcripts 202 and the unlabeled transcripts 218. Each element of the representative vector representation 206 corresponds to a unique n-gram that satisfies the conditions specified in action 204. Thereafter, at action 208, the TF-iDF score for each n-gram of the representative vector representation 206 may be determined for each of the ground truth transcripts 202 and for each of the unlabeled transcripts 218. Accordingly, the output of vectorizer 116 is a vector representation of each input transcript. This includes a respective ground truth transcript vector 220 for each input ground truth transcript 202, and a respective unlabeled transcript vector 222 for each input unlabeled transcript 218. In various examples, the ground truth transcript vectors 220 may be labeled with metadata indicating that they are ground truth transcript vectors, so that the automated fraud detection system 130 knows that these vectors represent transcripts that have been labeled as describing fraudulent activity.

Figure 3:
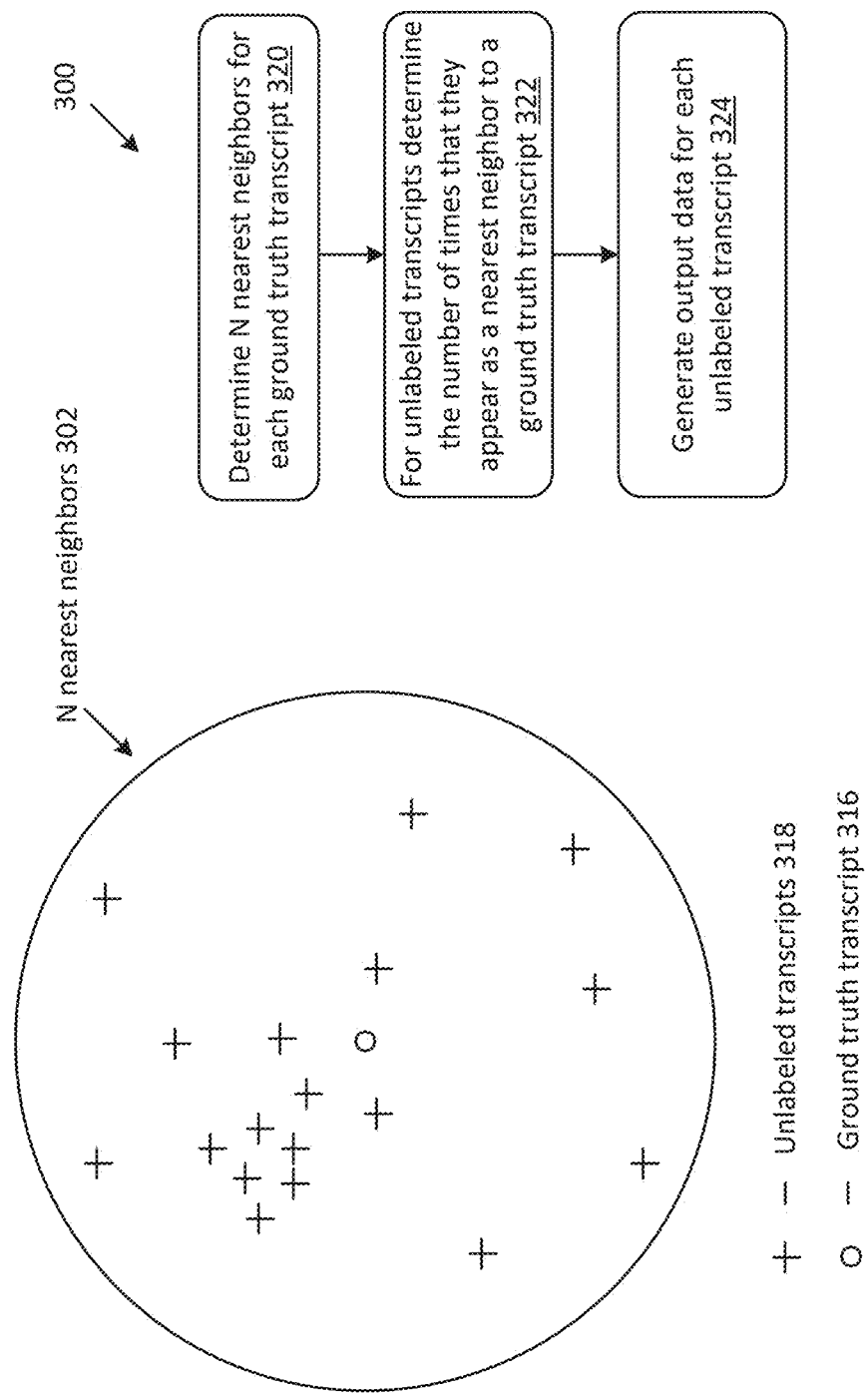
FIG. 3 is a diagram illustrating use of a nearest neighbor algorithm to detect fraud in text, in accordance with various aspects of the present disclosure.

FIG. 3 is a diagram illustrating use of a nearest neighbor algorithm to detect fraud in text, in accordance with various aspects of the present disclosure. After determining the ground truth transcript vectors 220 and the unlabeled transcript vectors 222, a dataset of the ground truth transcript vectors 220 and the unlabeled transcript vectors 222 may be used to perform clustering using a nearest neighbors algorithm (e.g., N nearest neighbors 302). In the example diagram shown in FIG. 3, unlabeled transcripts 318 are represented as plus signs, while a ground truth transcript is represented using a circle in a shared embedding space.

FIG. 3 illustrates an example process 300 for determining output data for each unlabeled transcript that indicates a likelihood that the unlabeled transcript describes fraudulent activity. The process 300 of FIG. 3 may be executed by one or more computing devices. The actions of process 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 300 may be described above with reference to elements of FIGS. 1-2. Although shown in a particular order, the steps of process 300 may instead be performed in a different order. Additionally, various steps may be performed in parallel in various implementations. Further, some steps may be omitted and/or other steps may be added in accordance with the peer-based anomalous rights detection techniques described herein.

At action 320, the N nearest neighbors for each ground truth transcript received may be determined. For example, in the N nearest neighbors 302, the nearest neighbors of a ground truth transcript 316 have been determined. Thereafter, at action 322, for each unlabeled transcript, the number of times that the unlabeled transcript appears as a nearest neighbor of a ground truth transcript may be determined. Thereafter, output data may be generated at action 324 that indicates, for each unlabeled transcript, the number of times the unlabeled transcript was the nearest neighbor to a ground truth transcript describing fraudulent activity. The output data may be used in a variety of ways. For example, the output data may be used to determine statistics about the number of calls received on a daily, weekly, monthly, etc., basis that are likely to pertain to a particular type of fraud. In another example, the output data may be used to perform topic modeling to determine a number of topics described in such transcripts and to determine keywords/keyphrases associated with the various topics. The transcripts identified as likely pertaining to fraud may be turned over to law enforcement and/or otherwise used to build a case against attackers. This list of uses of the output data is non-exhaustive.

Figure 4:
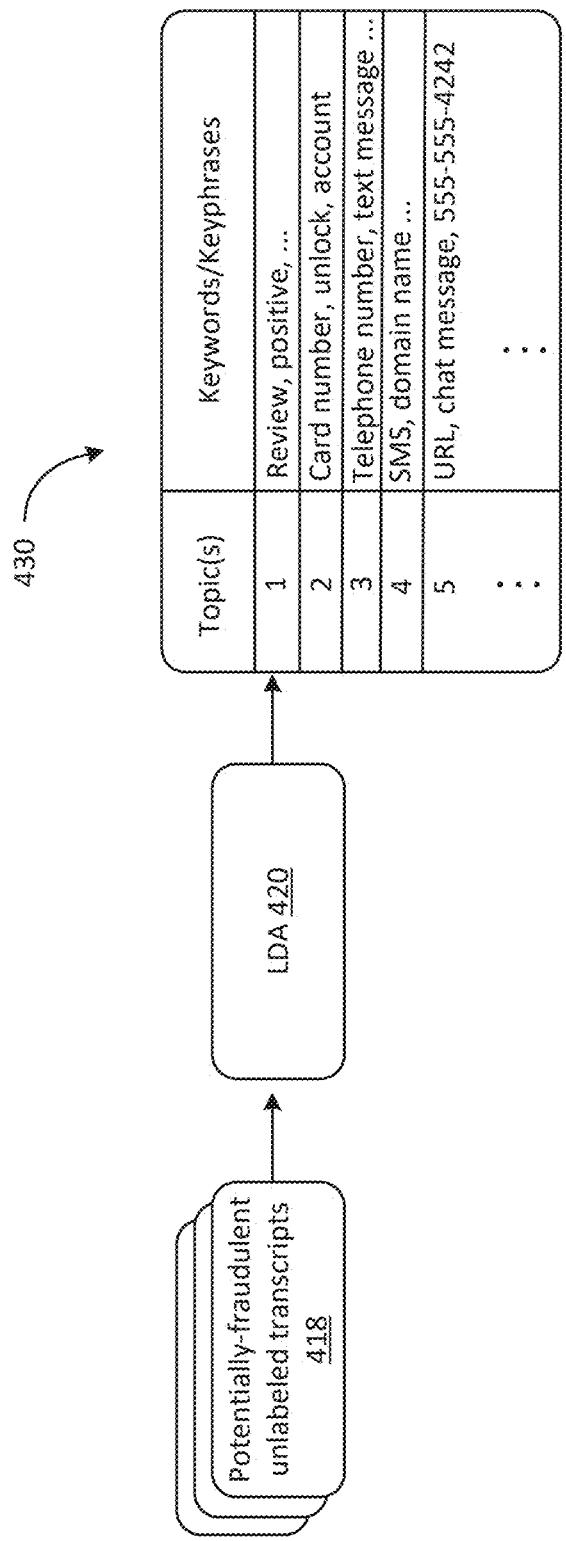
FIG. 4 is a diagram illustrating use of a topic modeling technique to determine a list of topics and associated keywords for potentially-fraudulent text, in accordance with various aspects of the present disclosure.

FIG. 4 is a diagram illustrating use of a topic modeling technique to determine a list of topics and associated keywords for potentially-fraudulent text, in accordance with various aspects of the present disclosure. In FIG. 4, potentially-fraudulent unlabeled transcripts 418 may be those transcripts that have been determined by the automated fraud detection system 130 as being likely to describe fraudulent activity. Various thresholds (e.g., a threshold number of ground truth transcript nearest neighbors) may be used to determine the potentially-fraudulent unlabeled transcripts 418. Such thresholds are tunable according to the desired precision and/or according to tolerance for false positives. The potentially-fraudulent unlabeled transcripts 418 may be input into a latent dirichlet allocation (LDA) algorithm 420.

Latent Dirichlet Allocation (LDA) is a generative statistical model that allows sets of observations to be explained by unobserved groups that explain why some parts of the data are similar. For example, if observations are words collected into transcripts, LDA posits that each transcript is a mixture of a small number of topics and that each word's presence in a transcript is attributable to one of the transcript's topics. LDA is an example of a topic model.

Accordingly, LDA algorithm 420 may output a codebook 430 that includes N topics (where N is an input to the LDA algorithm 420) associated with transcripts, and, for each of the N topics, one or more keywords and/or keyphrases included in the transcripts that define that topic. In the example depicted in FIG. 4, topic 1 includes the keywords "review" and "positive," and topic 2 includes the keywords/keyphrases "card number," "unlock," "account," etc. As shown, keywords/keyphrases in the codebook 430 may include a variety of different types of data including mention of "phone number" in transcripts, specific phone numbers in transcripts, URLs, domain names, etc. The codebook may be provided using various graphical user interfaces apart from what is specifically shown in FIG. 4. The codebook may provide various information that may be useful to classify, characterize, and/or identify fraudulent activity and/or its source. For example, keywords/keyphrases may describe what a person sounded like (e.g., characteristics of their voice), that the person was asked to call a specific telephone number and/or navigate to a particular URL, etc. This information may be used to build a legal case and/or a takedown (e.g., for a domain/URL associated with fraudulent activity) and/or to investigate potential sources of fraud.

Figure 5:
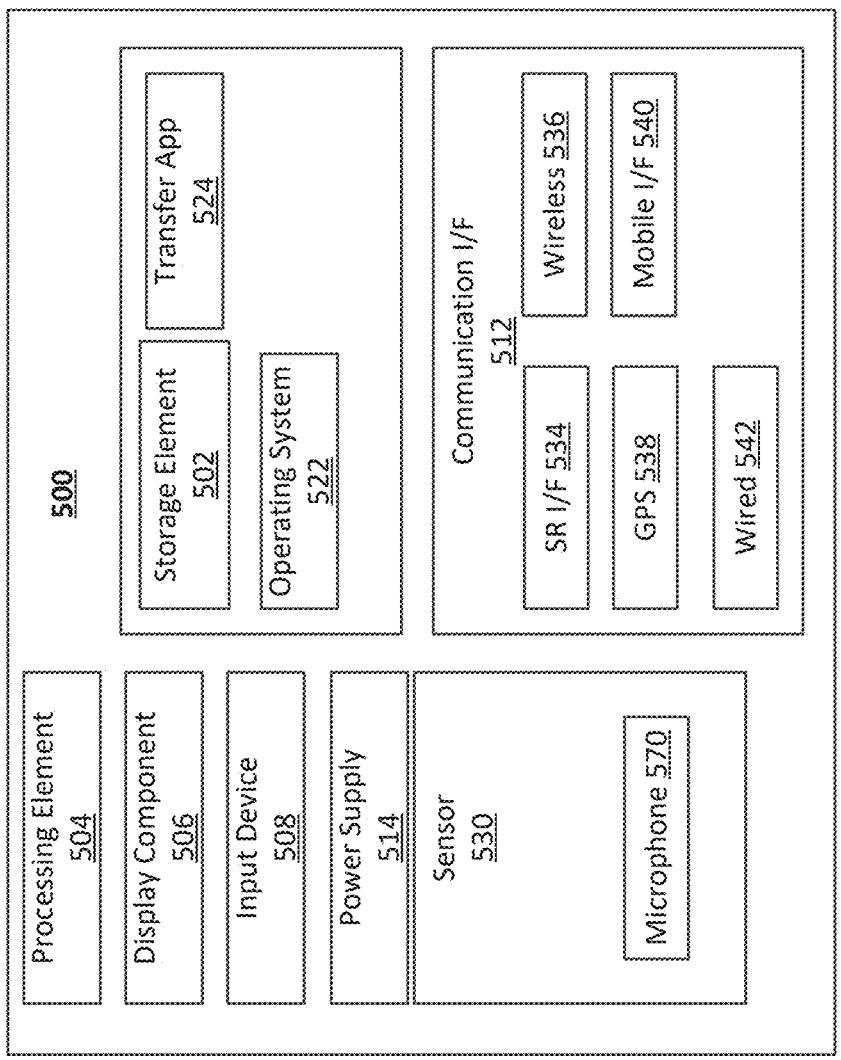
FIG. 5 is a block diagram showing an example architecture of a computing device that may be used in accordance with various embodiments described herein.

FIG. 5 is a block diagram showing an example architecture 500 of a computing device that may be used to implement, at least in part, a fraud detection in text system, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
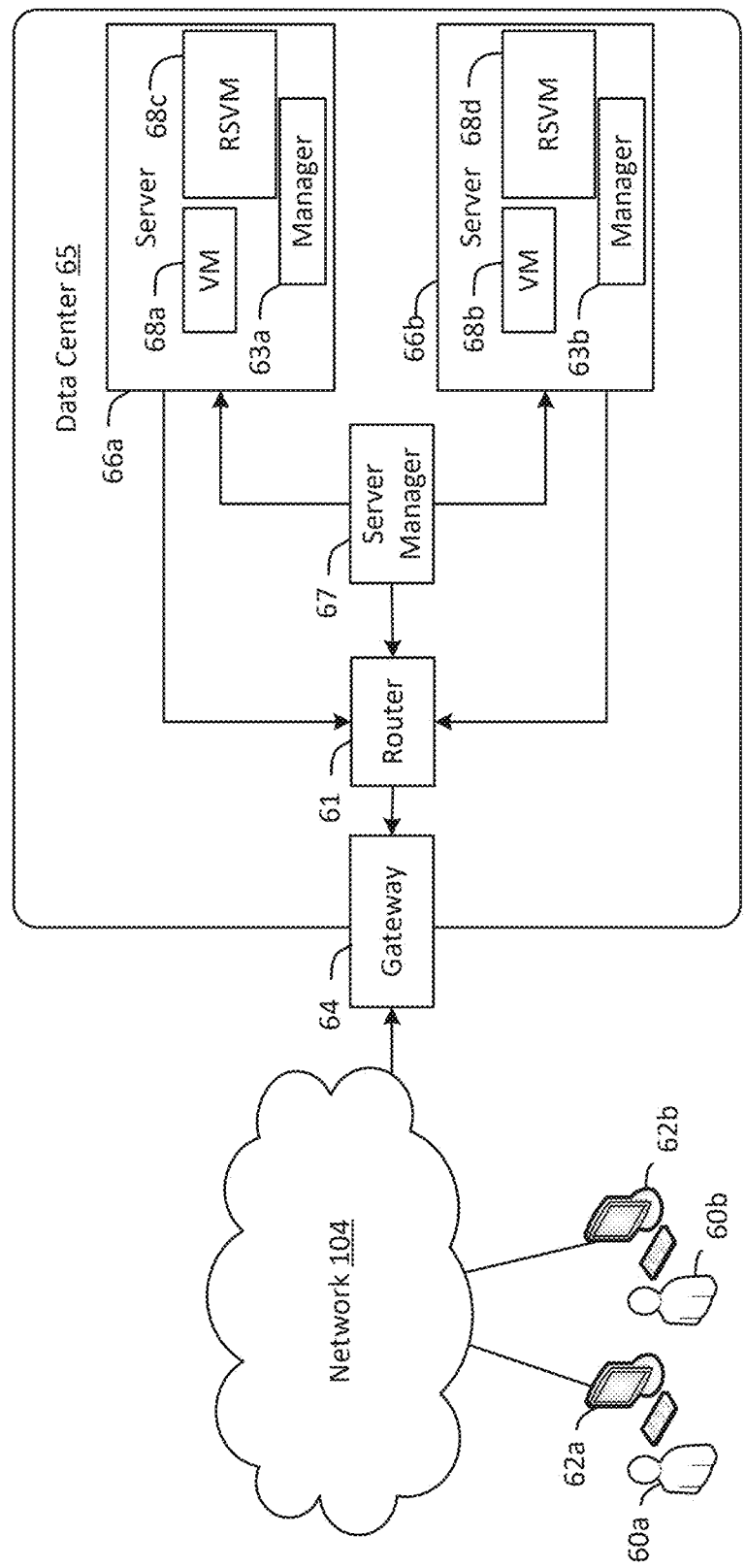
FIG. 6 is a diagram illustrating an example system for sending and providing data that may be used in accordance with the present disclosure.

An example system for implementing a fraud detection in text system will now be described in detail. In particular, FIG. 6 illustrates an example computing environment in which the embodiments described herein may be implemented. For example, the computing environment of FIG. 6 may be configured to provide fraud detection in text as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
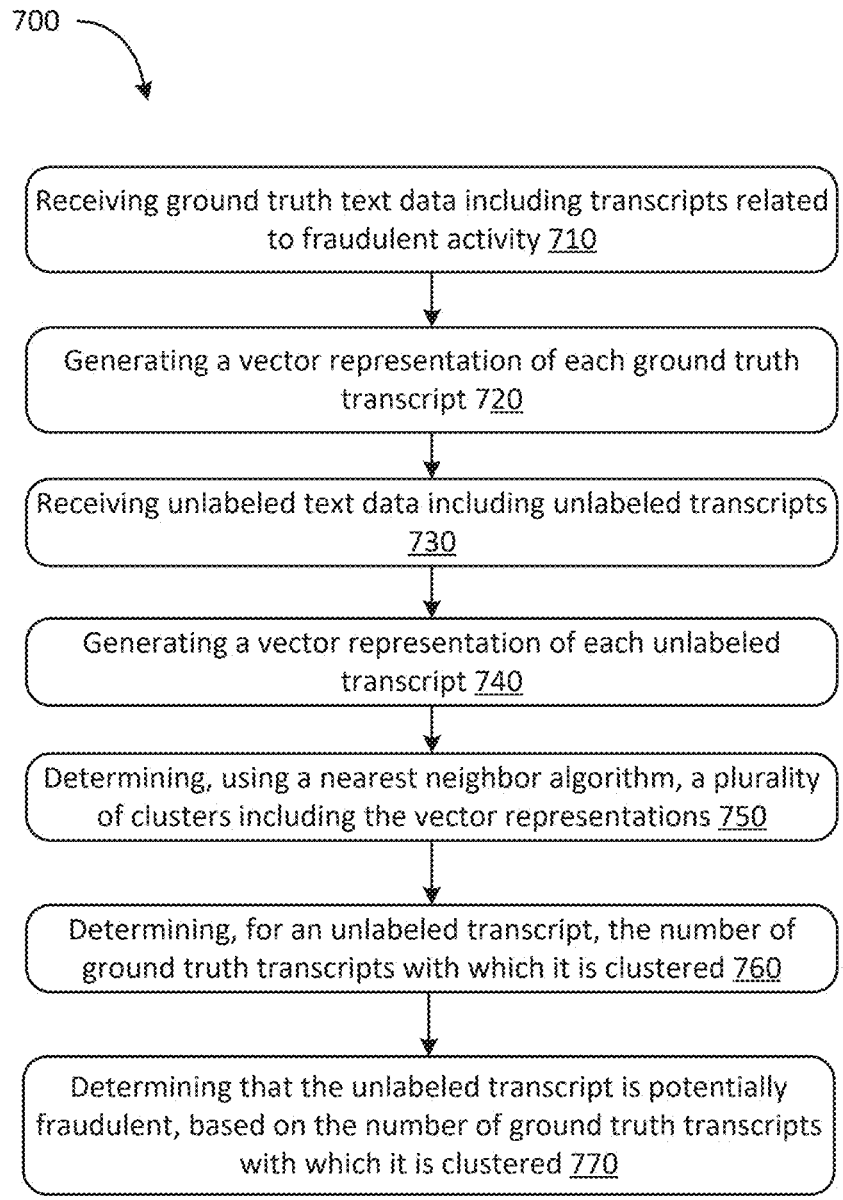
FIG. 7 is a flow diagram illustrating an example process for detecting descriptions of fraudulent activity in text data, according to various techniques described herein.

FIG. 7 is a flow diagram illustrating an example process 700 for detecting descriptions of fraudulent activity in text data, according to various techniques described herein. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the peer-based anomalous rights detection techniques described herein.

Process 700 may begin at action 710, at which ground truth text data including transcripts related to fraudulent activity may be received. In some examples, the ground truth text data may be originally be non-text, in some cases, and may be transcribed and/or translated into text using another system. The transcripts may include text that was typed by a user and/or a transcription of a voice call. In some other examples, the transcription may be determined using automatic speech recognition. The transcripts may be labeled as describing fraudulent activity (e.g., by a human annotator and/or by a machine learning classifier).

Process 700 may continue at action 720, at which a vector representation of each ground truth transcript may be generated. As described, the vector representation may represent TF-iDFscores of various n-grams present in the input corpus of ground truth transcripts. In order to reduce dimensionality, the n-grams may be those with a document frequency that is less than a maximum document frequency, but greater than a minimum document frequency, for the input corpus of ground truth transcripts received at action 710.

Process 700 may continue at action 730, at which unlabeled text data including unlabeled transcripts may be received. In some examples, the unlabeled text data may be originally be non-text, in some cases, and may be transcribed and/or translated into text using another system. For example, the unlabeled text data may be video and/or audio and may be transcribed into text using automatic speech recognition. In various examples, these unlabeled transcripts may be transcripts received recently (e.g., within the last day, month, week, etc.). However, any transcripts that have not been labeled may be received.

Process 700 may continue at action 740, at which a vector representation of each unlabeled transcript may be generated. As described, the vector representation may represent TF-iDFscores of the n-grams of the unlabeled transcripts. The n-grams may be those n-grams that were selected as being representative of the ground truth transcripts received at action 710. In order to reduce dimensionality, the n-grams may be those with a document frequency that is less than a maximum document frequency, but greater than a minimum document frequency, for the input corpus of ground truth transcripts received at action 710.

Process 700 may continue at action 750, at which a nearest neighbor algorithm may be used to determine a plurality of clusters including the vector representations of the unlabeled transcripts and the ground truth transcripts. Any nearest neighbor algorithm may be used (e.g., an approximate nearest neighbor algorithm). Processing may continue at action 760, at which the number of ground truth transcripts that are clustered together (as one of the N nearest neighbors) with a particular unlabeled transcript may be determined. A determination may be made at action 770 that the particular unlabeled transcript is potentially fraudulent based on the number of ground truth transcripts with which it is clustered at action 760.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of detecting description of fraud in text, the method comprising:
receiving first text data, the first text data representing a set of ground truth text transcripts, each ground truth text transcript of the set of ground truth text transcripts describes fraudulent activity;
determining a respective vector representation for each ground truth text transcript of the set of ground truth text transcripts, wherein each element of a particular vector representation represents a respective n-gram represented in the set of ground truth text transcripts, and wherein a value of each element of the particular vector representation is a term frequency inverse document frequency (TF-iDF) score for the respective n-gram for a particular ground truth text transcript;
receiving second text data, the second text data representing a set of unlabeled text transcripts;
determining a second vector representation for a first unlabeled text transcript of the set of unlabeled text transcripts, wherein each element of the second vector representation represents the respective n-gram of the set of ground truth text transcripts, and wherein the value of each element of the second vector representation is a respective TF-iDF score for the respective n-gram for the first unlabeled text transcript;
determining, using a nearest neighbor algorithm for a first ground truth text transcript of the set of ground truth text transcripts, whether the second vector representation is a nearest neighbor of the respective vector representation of the first ground truth text transcript;
in response to determining that the second vector representation is a nearest neighbor of the respective vector representation of the first ground truth text transcript, incrementing a first number;
determining, using the nearest neighbor algorithm for a second ground truth text transcript of the set of ground truth text transcripts, whether the second vector representation is a nearest neighbor of the respective vector representation of the second ground truth text transcript;
in response to determining that the second vector representation is a nearest neighbor of the respective vector representation of the second ground truth text transcript, incrementing the first number;
determining that the second text data describes fraudulent activity based at least in part on the first number satisfying a threshold number; and
generating output data indicating that the second text data describes fraudulent activity.

2. The method of claim 1, further comprising:
tokenizing the first text data based at least in part on removal of stop words to generate tokenized first text data comprising n-gram tokens; and
determining a set of n-grams that appear in greater than a predetermined minimum number of ground truth text transcripts and appear in less than a predetermined maximum number of ground truth text transcripts, wherein each element of the respective vector representation and the second vector representation represents a respective one of the n-grams of the set of n-grams.

3. The method of claim 1, further comprising:
determining a subset of the set of unlabeled text transcripts that describe fraudulent activity based at least in part on a similarity to one or more ground truth text transcripts in the set of ground truth text transcripts describing fraudulent activity;
determining, using latent dirichlet allocation (LDA), a first number of topics associated with the subset of the set of unlabeled text transcripts; and
determining, for each of the first number of topics, respective keywords for each topic, wherein the respective keywords are selected from among words of the subset of the set of unlabeled text transcripts.

4. A method comprising:
identifying ground truth text data, comprising a plurality of first transcripts related to fraudulent activity;
generating a respective first data representation of each transcript of the plurality of first transcripts;
identifying second text data, comprising a plurality of second transcripts;
generating a respective second data representation of each transcript of the plurality of second transcripts;
determining, by applying a nearest neighbor algorithm to a first transcript of the plurality of first transcripts, whether the respective second data representation is a nearest neighbor of the respective first data representation for the first transcript;
in response to determining that the respective second data representation is a nearest neighbor of the respective first data representation for the first transcript, incrementing a first number;
determining, by applying the nearest neighbor algorithm to a second transcript of the plurality of first transcripts, whether the respective second data representation is a nearest neighbor of the respective first data representation for the second transcript;
in response to determining that the respective second data representation is a nearest neighbor of the respective first data representation for the second transcript, incrementing the first number; and
determining, based on the first number satisfying a threshold number, that the respective second data representation corresponds to a transcript that is related to fraudulent activity.

5. The method of claim 4, further comprising:
inputting the respective first data representation for each transcript of the plurality of first transcripts and the respective second data representation into a nearest neighbor algorithm; and
determining N nearest neighbors to the respective second data representation in an embedding space.

6. The method of claim 5, further comprising:
determining, among the N nearest neighbors, a number of the N nearest neighbors that are associated with the plurality of first transcripts related to fraudulent activity, wherein determining that the respective second data representation corresponds to a transcript related to fraudulent activity is determined based at least in part on the number.

7. The method of claim 4, further comprising:
generating n-gram tokens representing words of the plurality of first transcripts; and
determining a set of the n-gram tokens that appear in greater than a minimum number of the plurality of first transcripts and appear in less than a maximum number of the plurality of first transcripts, wherein each element of a particular respective first data representation and the respective second data representation represents a respective one of the set of the n-gram tokens.

8. The method of claim 4, further comprising determining a similarity between the respective first data representation of a first transcript of the plurality of first transcripts and a second data representation of a second transcript of the plurality of second transcripts.

9. The method of claim 4, further comprising:
determining, using latent dirichlet allocation (LDA), a first number of topics associated with transcripts among the plurality of second transcripts determined to be related to fraudulent activity; and
determining, for each of the first number of topics, respective keywords for each topic, wherein the respective keywords are selected from among words of the transcripts among the plurality of second transcripts determined to be related to fraudulent activity.

10. The method of claim 4, further comprising:
removing stop words from the ground truth text data to generate modified ground truth text data; and
generating a tokenized representation of the modified ground truth text data by generating mono-gram and/or bi-gram tokens.

11. The method of claim 10, further comprising:
determining first tokens that appear in greater than a minimum percentage of the plurality of first transcripts and in less than a maximum percentage of the plurality of first transcripts; and
determining a representative vector, wherein each element of the representative vector is associated with a respective one of the first tokens, wherein the respective first data representation comprises the representative vector.

12. The method of claim 11, further comprising:
generating, for a first transcript of the plurality of first transcripts, the respective first data representation of the first transcript, wherein the respective first data representation comprises the representative vector and wherein a respective value for each element of the representative vector is a term frequency-inverse document frequency score for the respective one of the first tokens for the first transcript.

13. A system comprising:
at least one processor; and
non-transitory computer-readable memory storing instructions that, when executed by the at least one processor, are effective to:
identify ground truth text data, comprising a plurality of first transcripts related to fraudulent activity;
generate a respective first data representation of each transcript of the plurality of first transcripts;
identify second text data, comprising a plurality of second transcripts;
generate a respective second data representation of each transcript of the plurality of second transcripts;
determine, by applying a nearest neighbor algorithm to a first transcript of the plurality of first transcripts, whether the respective second data representation is a nearest neighbor of the respective first data representation for the first transcript;
in response to determining that the respective second data representation is a nearest neighbor of the respective first data representation for the first transcript, increment a first number;
determine by applying the nearest neighbor algorithm to a second transcript of the plurality of first transcripts, whether the respective second data representation is a nearest neighbor of the respective first data representation for the second transcript;
in response to determining that the respective second data representation is a nearest neighbor of the respective first data representation for the second transcript, incrementing the first number; and
determine, based on the first number satisfying a threshold number, that the respective second data representation corresponds to a transcript that is related to fraudulent activity.

14. The system of claim 13, wherein the non-transitory computer-readable memory stores further instructions that, when executed by the at least one processor, are further effective to:
input the respective first data representation for each transcript of the plurality of first transcripts and the respective second data representation into a nearest neighbor algorithm; and
determine N nearest neighbors to the respective second data representation in an embedding space.

15. The system of claim 14, the non-transitory computer-readable memory storing further instructions that, when executed by the at least one processor, are further effective to:
determine, among the N nearest neighbors, a number of the N nearest neighbors that are associated with the plurality of first transcripts related to fraudulent activity, wherein determining that the respective second data representation corresponds to a transcript related to fraudulent activity is determined based at least in part on the number.

16. The system of claim 13, the non-transitory computer-readable memory storing further instructions that, when executed by the at least one processor, are further effective to:
generate n-gram tokens representing words of the plurality of first transcripts; and
determine a set of the n-gram tokens that appear in greater than a minimum number of the plurality of first transcripts and appear in less than a maximum number of the plurality of first transcripts, wherein each element of a particular respective first data representation and the respective second data representation represents a respective one of the set of the n-gram tokens.

17. The system of claim 13, the non-transitory computer-readable memory storing further instructions that, when executed by the at least one processor, are further effective to:
determine a similarity between the respective first data representation of a first transcript of the plurality of first transcripts and a second data representation of a second transcript of the plurality of second transcripts.

18. The system of claim 13, the non-transitory computer-readable memory storing further instructions that, when executed by the at least one processor, are further effective to:
- determine, using latent dirichlet allocation (LDA), a first number of topics associated with transcripts among the plurality of second transcripts determined to be related to fraudulent activity; and
- determine, for each of the first number of topics, respective keywords for each topic, wherein the respective keywords are selected from among words of the transcripts among the plurality of second transcripts determined to be related to fraudulent activity.

19. The system of claim 13, the non-transitory computer-readable memory storing further instructions that, when executed by the at least one processor, are further effective to:
- remove stop words from the ground truth text data to generate modified ground truth text data; and
- generate a tokenized representation of the modified ground truth text data by generating mono-gram and/or bi-gram tokens.

20. The system of claim 19, the non-transitory computer-readable memory storing further instructions that, when executed by the at least one processor, are further effective to:
- determine first tokens that appear in greater than a minimum percentage of the plurality of first transcripts and in less than a maximum percentage of the plurality of first transcripts; and
- determining a representative vector, wherein each element of the representative vector is associated with a respective one of the first tokens, wherein the respective first data representation comprises the representative vector.

* * * * *